April 2, 1929.   F. C. A. L. STACKELBERG   1,707,820

LINE FLOAT FOR CASTING

Filed Sept. 13, 1926

FRITZ CARL ADOLF LOUIS STACKELBERG

INVENTOR

BY Otto Munk his ATTORNEY

Patented Apr. 2, 1929.

1,707,820

UNITED STATES PATENT OFFICE.

FRITZ CARL ADOLF LOUIS STACKELBERG, OF STOCKHOLM, SWEDEN.

LINE FLOAT FOR CASTING.

Application filed September 13, 1926, Serial No. 135,118, and in Sweden January 18, 1926.

This invention refers to a line float arranged for casting and so constituted that the line or lines from the float to the hook or hooks are during the casting kept around or inside the float in such a manner, that the line or lines with the hooks are, when the float enters the water, disengaged by their own weight and sink down into the water.

On many occasions it may be more convenient to use such a casting-float than to use a fishing rod. An advantage also resides in the fact, that with a device according to the invention the line may be thrown much farther than with a fishing rod.

Figure 1:
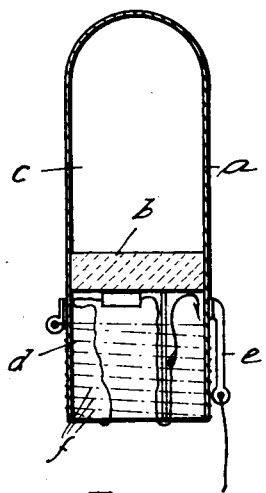
Figure 2:
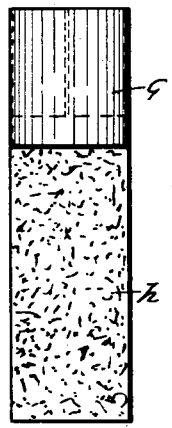
Figure 3:
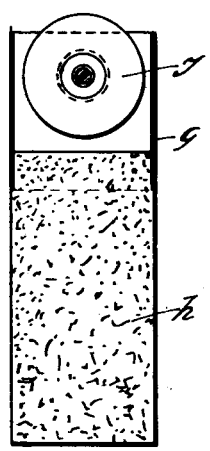
Figure 4:
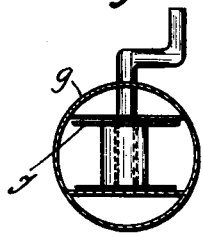

Different constructions of the said line float are shown in the accompanying drawings. Fig. 1 shows a construction of the float in axial section. Another construction is shown in Fig. 2 from the side. Figs. 3 and 4 show in axial section and cross section a modification of the float shown in Fig. 2.

In Fig. 1 the frame $a$ consists of a hollow metallic cylinder closed at one end and divided by a comparatively heavy plate $b$ into a water-tight, closed chamber $c$ and an open part $d$. The weight is so positioned that the open part turns downwards, when the float enters the water. The hold $e$ for the hand-line, that is to say, the line from the hand of the angler to the float, is arranged so that, when the float is swung round before casting the cylinder is very nearly radial with the open end of the cylinder turned to the centre of the direction of casting. The hold for the hook-line $f$, is preferably arranged diametrically opposite to the hold for the hand-line, so that the inner end of the hook-line can be fastened in it and that any excess length of the hook-line (dependent on the fishing depth) can also be fastened in it. In the open part of the cylinder the hook-like or a part of it with hook and bait lies during the swinging of the float. A part of the line may, as is shown in the drawing, be wound up round the lower part of the float. In the construction shown in Fig. 1 the open part of the cylinder is divided into two sections, one of which receives the hook with the bait.

In the constructions shown in Figs. 2-4 the open chamber for receiving the line and hook consists of a casing $g$, preferably of metal, which in the forms shown is cylindrical but can be of other suitable form. One end of the casing is closed by or otherwise suitably secured to a piece $h$ of cork or other material of smaller specific gravity than the casing and this piece is so fitted that the desired site of the centre of gravity is obtained. Thus the float will, when entering the water, turn the open end of the casing downwards.

In the float, shown in Figs. 3 and 4, a rotatory wheel $i$ is arranged in the casing $g$ and on to that wheel the line may be wound in such a way that it is kept wound during the casting but will, when the float falls into the water be automatically unwound. The wheel which may be replaced by an equivalent device is preferably arranged on a shaft which can be turned by a loose handle or spanner. The handle or spanner being fastened to the end of the line, to which the float is applied, will always be at hand without any risk of its loss. A winding device of said kind may be used not only with a float provided with a piece of cork or the like, as is shown in Fig. 3, but also in other constructions of the float.

In a float, according to the invention, one can if one desires arrange several hook-lines. For that purpose the float may in its lower part be provided with several chambers opening downwardly separated from each other, each of them receiving one line.

Further the details may be modified without departing from the invention as defined by the appended claims.

Having now described my invention, what I claim as new and desire to secure by Letters Patent is:

1. A float for fishing tackle, comprising a buoyant portion at one end and a compartment at the other end, the end of the compartment being open and adapted to be supported in the water by the buoyant portion, a line and hook arrangement disposed in said compartment, and means for carrying the line and hook to automatically release same when the float is cast into the water.

2. A float, as claimed in claim 1, in which the buoyant portion and compartment comprise a tube closed at one end, and a partition disposed in said tube to form a water tight chamber between it and the closed end, substantially as described.

3. A float for fishing tackle, comprising a tubular member closed at one end, a weighted partition in said tube to form a water tight chamber between it and the closed end, the remainder of the tube forming a compartment for the hook and fishing line, means near the open end of said compartment to receive a hand line and means diametrically opposite the said means and near the opposite end of the compartment to receive the inner end of the fishing line.

In witness whereof, I have hereunto signed my name.

FRITZ CARL ADOLF LOUIS STACKELBERG.